United States Patent
Novich et al.

(10) Patent No.: US 6,610,400 B2
(45) Date of Patent: Aug. 26, 2003

(54) SIZING COMPOSITIONS, METHODS AND APPARATUS FOR CLEANING SIZED FIBER GLASS STRANDS, YARNS AND FABRICS

(75) Inventors: Bruce E. Novich, Pittsburgh, PA (US); Caroline S. Harris, Pittsburgh, PA (US); Kami Lammon-Hillnski, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/573,217

(22) Filed: May 19, 2000

(65) Prior Publication Data
US 2003/0072941 A1 Apr. 17, 2003

Related U.S. Application Data
(60) Provisional application No. 60/136,552, filed on May 28, 1999.

(51) Int. Cl.[7] .......... D02G 3/00; D06M 1/00; C08F 4/42; B32B 9/00; B05D 3/02
(52) U.S. Cl. .......... 428/378; 428/375; 428/392; 252/8.83; 526/90; 526/95; 442/59; 427/372.2; 427/384
(58) Field of Search .......... 428/375, 372, 428/378, 389, 392, 394, 395; 106/287.18, 287.19; 8/115.6; 526/86, 90, 95, 96, 104, 107; 427/372.2, 384; 442/152, 164, 172, 59; 252/8.83

(56) References Cited

U.S. PATENT DOCUMENTS

| | | | | |
|---|---|---|---|---|
| 4,232,062 A | * | 11/1980 | Okino et al. | 427/160 |
| 4,268,577 A | * | 5/1981 | Fahey | 428/394 |
| 4,369,264 A | * | 1/1983 | Baumann et al. | 523/209 |
| 4,542,106 A | | 9/1985 | Sproull | 501/38 |
| 4,892,712 A | * | 1/1990 | Robertson et al. | 422/186 |
| 4,966,759 A | * | 10/1990 | Robertson et al. | 422/186 |
| 5,710,086 A | * | 1/1998 | Brunelle et al. | 502/171 |
| 5,789,329 A | | 8/1998 | Eastes et al. | 501/36 |
| 5,908,497 A | * | 6/1999 | Morfesis et al. | |
| 6,037,289 A | * | 3/2000 | Chopin et al. | 502/2 |
| 6,165,256 A | * | 12/2000 | Hayakawa et al. | 106/13 |
| 6,239,050 B1 | * | 5/2001 | Lammon-Hilinski et al. | 442/180 |

FOREIGN PATENT DOCUMENTS

| | | | |
|---|---|---|---|
| DE | 19620668 C1 | 5/1996 | C09D/185/00 |
| JP | 8-119682 | 5/1996 | |
| WO | 99/64364 | 12/1999 | C03C/25/02 |
| WO | WO 00/73234 A1 | * 10/2000 | |

OTHER PUBLICATIONS

*The Manufacturing Technology of Continuous Glass Fibres*, by K. L. Loewenstein (3rd Ed 1993) pp. 30–44, 47–60, 115–122, 126–135, 165–171, 238–241 and 325–330.
P.K. Gupta, "Glass Fibers for Composite Materials", *Fiber Reinforcements for Composite Materials, Composite Materials Series*, 2, A.R. Bunsell, ed. 1988, pp. 19–71.
James Mark et al., *Inorganic Polymers*, 1992, p. 1.

(List continued on next page.)

*Primary Examiner*—Cynthia H. Kelly
*Assistant Examiner*—J. M. Gray
(74) *Attorney, Agent, or Firm*—Andrew C. Siminerio; Dennis G. Millman

(57) ABSTRACT

The disclosed invention relates generally to sizing compositions, methods and apparatus for cleaning sized fiber glass strands, yarns and fabric without the use of high temperature thermal processes. More specifically, the invention relates to sizing compositions comprising a photocatalytically degradable organic material and a photocatalyst material, and methods and apparatus for cleaning photocatalytically degradable organic materials from the surface of the fiber glass strand.

31 Claims, 5 Drawing Sheets

OTHER PUBLICATIONS

*Encyclopedia of Polymer Science and Technology*, vol. 6, 1967, pp. 505–712.

T. Sakata, " Heterogeneous Photocatalysts at Liquid–Solid Interfaces", *Photocatalysis, Fundamentals and Applications*, N. Serpone & E. Pelizzetti eds., 1989, pp. 311–338.

W. Callister, Jr., *Materials Science and Engineering: An Introduction*, (2nd Ed., 1991, pp. 608 and 756.

G. Hawley, *The Condensed Chemical Dictionary*, (10th Ed., 1981) pp. 914–915.

N. Lewis, et al., " Theory of Semiconductor Materials", *Photocatalysis, Fundamentals and Applications*, N. Serone & E. Pelizzetti eds., 1989, pp. 46–48 and 55.

F. Scandola et al., Interaction Between Light and Matter, *Photocatalysis, Fundamentals and Applications*, N. Serone & Pelizzetti eds., 1989 at pp. 10–11.

* cited by examiner

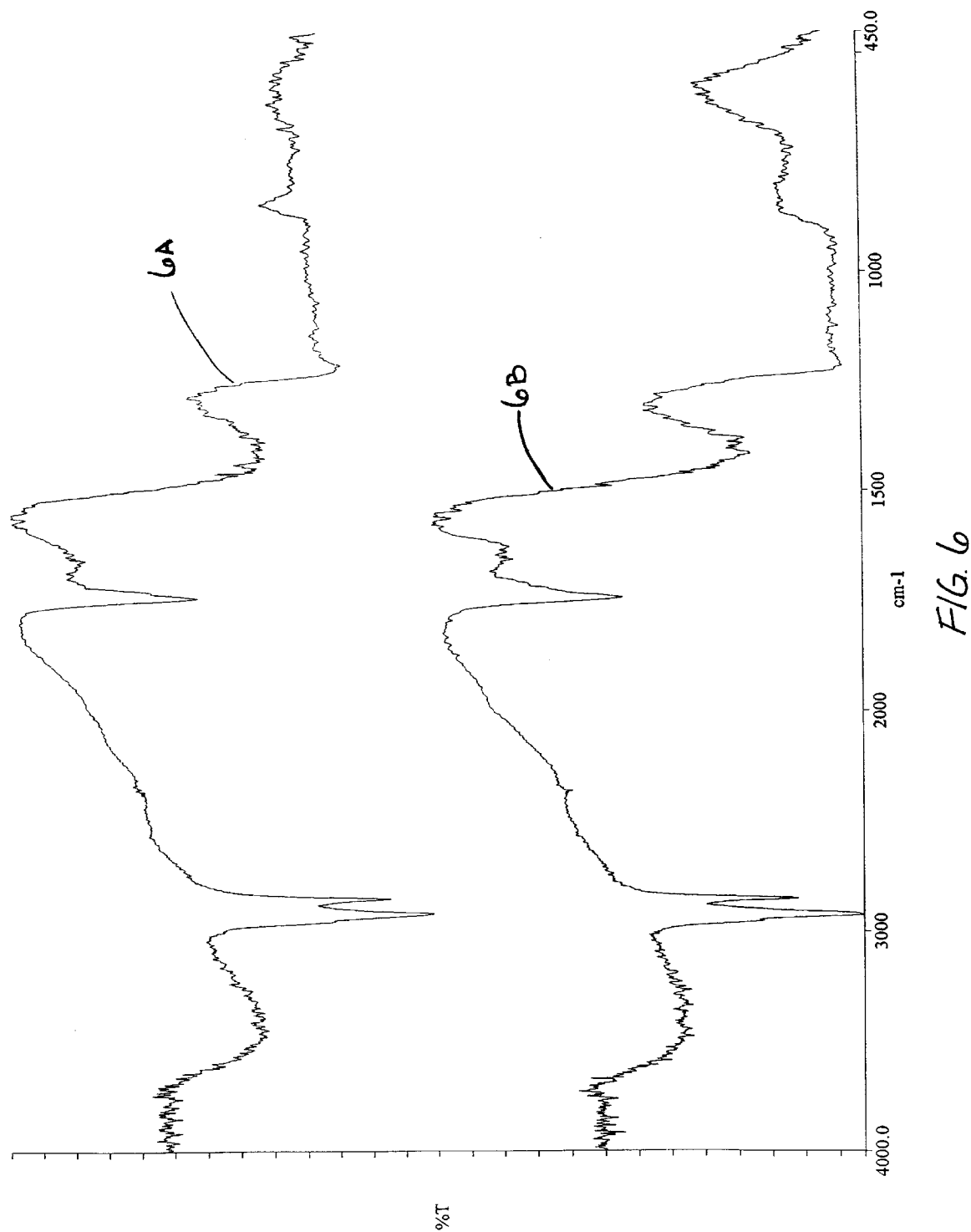

SIZING COMPOSITIONS, METHODS AND APPARATUS FOR CLEANING SIZED FIBER GLASS STRANDS, YARNS AND FABRICS

CROSS REFERENCE TO RELATED PATENT APPLICATION

This application claims the benefit of U.S. Provisional Application No. 60/136,552, filed May 28, 1999.

BACKGROUND OF THE INVENTION

1. Field of the Invention

This invention relates generally to sizing compositions, methods and apparatus for cleaning sized fiber glass strands, yarns and fabrics without the use of high temperature thermal processes.

2. Technical Considerations

Glass fiber strands are coated during the forming process with a sizing composition to protect their surfaces from abrasion and scratching. Generally, not only are the sizing compositions formulated to protect the fibers during forming, but also to provide the fiber strands with requisite characteristics and properties needed for further processing. In the case of fiber strands used to form yarns to be woven into fabrics, in addition to protecting the fibers during forming, the sizing composition must also provide for good weavibilitity, particularly on air-jet looms. Typically, such fibers are combined with polymeric matrix materials to form composites or laminates so it would also be advantageous if the sizing composition was compatible (i.e. provided for good wetting and bonding between the matrix material and the surface of the glass) with the polymeric matrix material. However, typical sizing compositions used on glass fiber strands formed into fabrics or mats to be incorporated into printed circuit boards are not compatible with the polymeric matrix material and must be removed prior to incorporation.

Typical sizing compositions used for textile (i.e. fabric) applications are disclosed in K. Loewenstein, *The Manufacturing Technology of Continuous Glass Fibers* (3rd Ed., 1993) at pages 238–241 which are hereby incorporated by reference. Such sizing compositions generally comprise modified starches (such as partially or fully dextrised starches) and oils (such as hydrogenated vegetable oils) that are not compatible with the conventional resin matrix materials used to form laminates for printed circuit board applications. While it is possible to incorporate fibers having starch/oil sizings on their surfaces into such resin matrix materials to form composites, the mechanical properties (particularly flexural strength) and hydrolytic stability of the composites are typically not acceptable for use in printed circuit board applications. Therefore, prior to incorporating fabrics made from fibers coated with such sizing compositions into the resin matrix, the sizing composition must first be removed (or de-oiled) from the surface of the fibers. The sizing removal is typically accomplished by a heat cleaning or washing operation.

Heat cleaning is a process that is both time consuming and deleterious to the mechanical properties of the glass. Conventional heat cleaning processes involve heating the glass fabric at about 380° C. for 60–80 hours. After cleaning, the fabric must be re-coated with a coating or finishing size that is compatible with the polymeric matrix material. The finishing size typically includes a silane coupling agent that promotes wetting of the polymeric matrix material on the surface of the glass fiber as well as coupling (or bonding) between the glass fiber and the polymer. However, heat cleaning processes are not always completely successful in removing the non resin-compatible materials from the glass surface and can further provide for contamination of the fabric with the products of decomposition from the sizing material. Additionally, it has been observed that the tensile strength of glass fibers exposed to elevated temperatures decreases with increasing temperature. See P. K. Gupta, "Glass Fibers for Composite Materials," *Fiber Reinforcements for Composite Materials. Composite Materials Series*, 2, A. R. Bunsell, ed. (1988) at pages 19–71 and W. H. Otto, *Proceedings of Sixth Sagamore Ordinance Materials Research Conference on Composite Materials and Composite Structures*, (1959), which are hereby incorporated by reference. While the application of a finishing size to the glass fiber fabric can increase the tensile strength of the fabric after heat cleaning, the tensile strength of the finished fabric is still lower than that of fabric that has not been heat cleaned.

Further disadvantages of the heat cleaning process are the large floor space required for the heat cleaning equipment, as well as the cost and maintenance of the heat cleaning equipment itself.

One alternative to de-oiling by heat cleaning is to wash the fabric with a solvent, preferably water, to remove the sizing composition. However, water washing can require the re-formulation of the sizing composition to provide for increase water solubility. For example, Japanese Patent Application No. 8-119-682 discloses a primary sizing composition containing a water-soluble epoxy resin that can be easily removed by rinsing with water. Non-aqueous solvent cleaning is generally not desirable for environmental and safety reasons.

It would be advantageous to provide a method and apparatus for de-oiling a variety of sizing compositions without the use of high temperature thermal processes and without the need for substantial re-formulation of conventional sizing compositions, that is environmentally friendly and can be done in-line with a other processing equipment. Additionally, there is a need for sizing compositions that can be easily de-oiled without the use of high temperature thermal processes.

SUMMARY OF THE INVENTION

One aspect of the present invention is a sizing composition for use in a fiber forming operation, the sizing composition comprising: a photocatalytically degradable organic material; and a photocatalyst material, wherein the photocatalyst material is capable of degrading at least a portion of the photocatalytically degradable organic material upon exposure to at least one radiation source having a wavelength sufficient to activate the photocatalyst material.

Another aspect of the present invention is a fiber strand comprising a plurality of individual filaments, at least one filament of the plurality of individual filaments comprising a residue of a coating composition positioned upon at least a portion of a surface of the at least one filament, the coating composition comprising: a photocatalytically degradable organic material; and a photocatalyst material, wherein the photocatalyst material is capable of degrading at least a portion of the photocatalytically degradable organic material upon exposure to at least one radiation source having a wavelength sufficient to activate the photocatalyst material.

Still another aspect of the present invention is a fabric comprising one or more fiber strands comprising a residue of a coating composition positioned upon at least a portion of a surface of at least one of the one or more fiber strands, the coating composition comprising: a photocatalytically degradable organic material; and a photocatalyst material, wherein the photocatalyst material is capable of degrading at least a portion of the photocatalytically degradable organic material upon exposure to at least one radiation source having a wavelength sufficient to activate the photocatalyst material.

Another aspect of the present invention is a method of forming a fiber strand, the method comprising the steps of: attenuating a plurality of individual filaments from a fiber forming apparatus; applying a coating composition to at least a portion of the surface of one or more of the plurality of individual filaments, the coating composition comprising a photocatalytically degradable organic material, and a photocatalyst material; gathering the plurality of individual filaments together to form a coated fiber strand; and exposing the coated fiber strand to at least one radiation source having an wavelength sufficient to activate the photocatalyst to photocatalytically degrade at least a portion of the photocatalytically degradable organic material.

BRIEF DESCRIPTION OF THE DRAWINGS

FIG. 6 is a composite plot of spectra taken using diffuse reflectance infrared spectroscopy of a sizing composition incorporating features of the present invention before and after exposure to ultraviolet radiation.

DETAILED DESCRIPTION OF THE INVENTION

The sizing compositions, methods and apparatus of the present invention provide for fiber glass strands, yarns and fabrics that can be easily de-oiled without the use of high temperature thermal process and without the need for substantial re-formulation of sizing the compositions. Additionally, they provide for environmentally friendly de-oiling processes that can be adapted for use in-line with weaving looms or other processing equipment. Fiber strands, yarns and fabrics made from the sizing compositions, methods and apparatus of the present invention have good mechanical properties and good wet-out and wet-through of polymeric matrix material. As used herein, the term "wet-out" means the penetration of the matrix material through the fiber strand bundle, and the term "wet-though" means the penetration of the matrix material between strands. Additionally, composites made from fiber glass strands, yarns and fabrics made using the sizing compositions, methods and apparatus of the present invention can provide for good laminate strength, good thermal stability and good hydrolytic stability.

Figure 1:
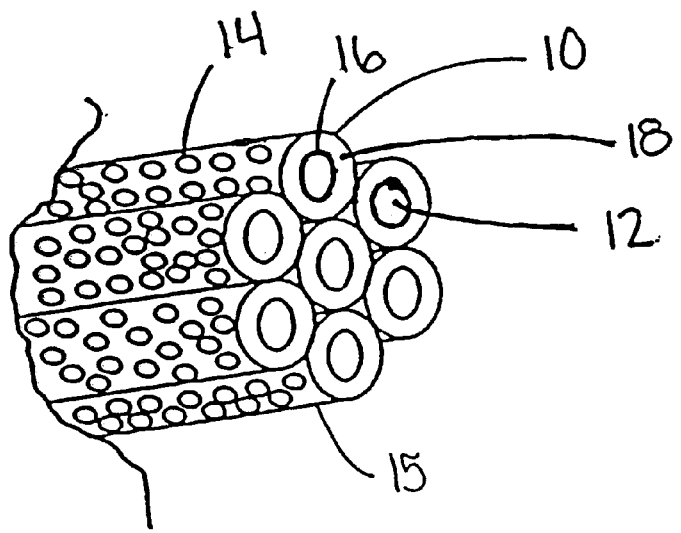
FIG. 1 is a perspective view of a coated fiber strand having a primary layer of a dried residue of a sizing composition incorporating features of the present invention.

Referring now to the figures wherein like numerals indicate like elements throughout, there is shown in FIG. 1 a fiber glass strand 10 comprising a plurality of individual fibers (or filaments) 12. As used herein, the term "strand" means a plurality of individual fibers. The term "fiber" means an individual filament.

The fibers 12 can be formed from any type of fiberizable material known to those skilled in the art including fiberizable inorganic materials, fiberizable organic materials, fiberizable natural materials and mixtures and combinations thereof. It will be appreciated by one skilled in the art that the fiberizable inorganic materials, the fiberizable organic materials and the fiberizable natural materials can also be polymeric materials. As used herein, the term "polymeric material" means a material formed from macromolecules composed of long chains of atoms that are linked together and that can become entangled in solution or in the solid state. See James Mark et al., *Inorganic Polymers*, (1992) at page 1, which is hereby incorporated by reference.

Preferably, the fibers 12 are formed from an inorganic fiberizable glass material. Fiberizable glass materials useful in the present invention include but are not limited to those prepared from fiberizable glass compositions such as "E-glass", "A-glass", "C-glass", "D-glass", "R-glass", "S-glass", and E-glass derivatives. As used herein, "E-glass derivatives" means glass compositions which include minor amounts of fluorine and/or boron and are preferably fluorine and/or boron-free. Furthermore, as used herein, minor means less than about 1 weight percent fluorine and less than about 5 weight percent boron. Preferred glass fibers are formed from E-glass or E-glass derivatives. Such compositions and method of making glass filaments therefrom are well known to those skilled in the art and further discussion thereof is not believed to be necessary in view of the present disclosure. If additional information is needed, such glass compositions and fiberization methods are disclosed in *Loewenstein* (3rd Ed., 1993) at pages 30–44, 47–60, 115–122 and 126–135; and U.S. Pat. Nos. 4,542,106 and 5,789,329, which are hereby incorporated by reference.

Non-glass fibers believed to be useful in the present invention and methods of preparing and processing such fibers are discussed at length in the *Encyclopedia of Polymer Science and Technology*, Vol. 6 (1967) at pages 505–712, which are hereby incorporated by reference.

The present invention will now be discussed generally in the context of glass fiber strands, although one skilled in the art would understand that the strand 10 can comprise fibers 12 formed from any fiberizable material known in the art, such as those discussed above, or any combination of fiberizable materials. Furthermore, while the present invention for clarity will be discussed in term of a sizing composition applied to the fibers during forming, it will be appreciated by one skilled in the art that the coating composition of the present invention can be applied to the fibers at any time during the processing of the fibers. For example, the compositions of the present invention can be applied to the fibers after the fibers have been processed into a fabric to remove any other sizing compositions applied prior to the application of the composition of the present invention (as discussed below in detail).

With continued reference to FIG. 1, the fibers 12 of the strand 10 have an at least partial coating 18 of a sizing composition comprising a photocatalytically degradable organic material 15 and a photocatalyst material 14 applied to at least a portion of the surfaces 16 thereof. As used herein, the term "photocatalyst" or "photocatalyst material"

means a material wherein valence band electrons, upon exposure to photons of a given energy, are promoted into the conduction band with the simultaneous generation of corresponding holes in the valence band. As used herein, the term "activate" or "activation" refers to the generation of electrons and holes in the photocatalyst material upon exposure to photons of a given energy, as discussed above. These electrons and holes are consumed by reducing electron acceptors and oxidizing electron donors, respectively, that are adsorbed on the surface of the photocatalyst. See T. Sakata, "Heterogeneous Photocatalysis at Liquid-Solid Interfaces", *Photocatalysis* at pages 311–313, which are hereby incorporated by reference. As used herein, the phrase "photocatalytically degradable organic materials" means organic materials that are capable of being at least partially degraded, directly or indirectly, by photocatalytically driven reaction(s). In the present invention, the photocatalytically degradable organic materials of the sizing compositions are at least partially removed from at least a portion of the surface of the strand upon exposure of the strand to at least one radiation source, particularly ultraviolet radiation sources, by photocatalytically driven oxidation-reduction ("redox") reactions (discussed below).

While the photocatalyst material 14 can be applied to the fiber strand after forming, preferably the photocatalyst is added directly to the sizing composition and applied to the individual fiber(s) 12 during forming. The photocatalyst 14 can be added to any conventional, sizing composition comprising a photocatalytically degradable organic material. For example, although not limiting in the present invention, the photocatalyst material 14 can be added to the starch/oil compositions previously discussed, to form a sizing composition in accordance with the present invention that can be at least partially de-oiled or removed from the surface of the fibers 12 of the strand 10 without the use of high temperatures or solvent washing.

The photocatalyst can be selected from the group consisting of photosensitive organic molecules, semiconductors and combinations thereof. Preferably, although not limiting in the present invention, the photocatalyst material is a semiconductor photocatalyst. As used herein, the term "semiconductor photocatalyst" means a photocatalyst material that is formed from a semiconductor, and the term "semiconductor" means an element or compound that has a filled valence band at 0 K, has a relatively narrow band-gap energy and has an electrical conductivity intermediate between that of a conductor and an insulator. Generally the conductivities of semiconductors range from about $10^{-6}$ (Ohms-meters)$^{-1}$ to about $10^{4}$ (Ohms-meters)$^{-1}$, whereas the conductivities of insulators ranges between about $10^{-10}$ (Ohms-meters)$^{-1}$ to about $10^{-20}$ (Ohms-meters)$^{-1}$ and conductors have conductivities on the order of about $10^{7}$(Ohms-meters)$^{-1}$. See W. Callister, Jr., *Materials Science and Engineering An Introduction* (2nd Ed., 1991) at page 608 and 756; and G. Hawley, *The Condensed Chemical Dictionary*, (10th Ed., 1981) at page 914–915, which are hereby incorporated by reference.

Although not limiting in the present invention, suitable semiconductor photocatalysts can have a crystal structure selected from the group consisting of diamond cubic, zincblende, rock salt, and wurtzite. Examples of suitable semiconductor photocatalysts having a diamond cubic crystal structure include, but are not limited to, silicon and germanium. Examples of suitable semiconductor photocatalysts having a zincblende structure include, but are not limited to, zinc sulfide, gallium arsenide, indium phosphide and gallium phosphide. Examples of suitable semiconductor photocatalysts having a rock salt structure include, but are not limited to, lead sulfide, lead selenide, and tin telluride. Examples of suitable semiconductor photocatalysts having a wurtzite structure include, but are not limited to, zinc selenide, cadmium selenide and zinc oxide. For more information on suitable semiconductor crystal structures see N. Lewis et al., "Theory of Semiconductor Materials", *Photocatalysis* at pages 46–48, which are hereby incorporated by reference.

Other suitable semiconductor photocatalysts include metal dichalcongenides and metal oxides. As used herein the term "dichalcogenide" means a material generally having a $AB_2$ stoichiometry wherein a metal layer (A) is positioned between two chalcogenide layers (B), and where the intermolecular bonding between the layers A and B is due solely to van der Waals forces. Examples of suitable metal dichalcogenides include, but are not limited to, molybdenum disulfide, tungsten diselenide, and tungsten disulfide. Examples of suitable metal oxides include, but are not limited to, titanium dioxide, tungsten trioxide, iron oxide, and zinc oxide.

In one non-limiting embodiment of the present invention, the semiconductor photocatalyst is in the form of a powder and preferably in the form of a powder having a high surface area (i.e. a surface area greater than about 10 square meters per gram). A specific, non-limiting example of a preferred metal oxide photocatalyst having a high surface area is Degussa P25 Titanium Dioxide powder, which is commercially available from Degussa Corporation of Germany and has surface area of about 25 square meters per gram.

Although not meant to be limiting in the present invention, as previously discussed, when exposed to photons of a given energy (i.e. a given wavelength of light discussed below), photocatalyst materials undergo an internal transition in which electrons from the valence band are promoted to the conduction band and holes are generated in the valence band. These free electrons and holes can interact with materials adsorbed to the surface of the photocatalyst in redox reactions.

Although not meant to be bound by any particular theory, it is believed that organic materials, such as those used to form conventional starch/oil sizing compositions, can be directly broken down into volatile components, such as carbon dioxide and water vapor, and removed from the surface of the glass fibers by redox reactions driven by the photocatalyst. For example, a hydrocarbon, such as ethylene, can be directly broken down into carbon dioxide and hydrogen in the presence of a photocatalyst, water and the appropriate radiation (hv) in the following hypothesized reaction:

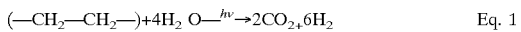

Eq. 1

See T. *Sakata* at pages 315–316, which are hereby incorporated by reference.

Additionally, hydroxylions and/or oxygen adsorbed on the surface of the photocatalyst can be oxidized or reduced according to the following hypothesized reactions:

Eq. 2

Eq. 3 wherein $h^+$ and $e^-$ are the free holes and electrons, respectively, generated at the surface of the photocatalyst upon exposure to the appropriate radiation. The highly reactive hydroxyl radicals (OH) and superoxide ions ($O^{2-}$) formed in these reactions can further react with the organic components of the sizing composition to degrade and remove them from the surface of the glass fibers. As used herein, the degradation of organic materials by intermediate species generated by photocatalytic reactions (such as hydroxyl radicals and superoxide ions as described in Eq. 2 and Eq. 3) is referred to as "indirect degradation," whereas the direct break down of organic materials by photocatalytic reactions, as described by Eq. 1, is referred to as "direct degradation."

It will be recognized by one skilled in the art that the exact wavelength of light required to cause the internal transition in the photocatalyst and drive the redox reactions depends largely on the band-gap energy of the photocatalyst. The wavelength of light is related to the frequency of the light and to the energy of the photons by the following equations:

$$\lambda \nu = c \quad \text{Eq. 4}$$

$$E = h\nu \quad \text{Eq. 5}$$

wherein $\lambda$ is the wavelength of the radiation, $\nu$ is the frequency of the radiation, c is the speed of light in a vacuum ($2.998 \times 10^8$ meters per second), E is the energy of the photons and h is Plank's constant ($6.63 \times 10^{-34}$ Joules-seconds). See F. Scandola et al., "Interactions Between Light and Matter", *Photocatalysis* at pages 10–11, which are hereby incorporated by reference. Generally, although not meant to be limiting in the present disclosure, it is believed that if the energy of the photons (E) is greater than or equal to the band-gap energy of the photocatalyst, the transitions can occur (i.e. the photocatalyst is activated). A non-limiting list of band-gap energies for photocatalyst materials believed to be useful in the present invention is given below in Table 1:

TABLE 1[1]

| Photocatalyst | Band-Gap Energy (eV) |
|---|---|
| germanium (Ge) | 0.7 |
| silicon (Si) | 1.12 |
| molybdenum disulfide ($MOS_2$) | 1.2 |
| indium phosphide (InP) | 1.35 |
| gallium arsenide (GaAs) | 1.44 |
| cadmium telluride (CdTe) | 1.5 |
| cadmium selenide (CdSe) | 1.7 |
| iron oxide ($Fe_2O_3$) | 2.2 |
| gallium phosphide (GaP) | 2.26 |
| cadmium sulfide (CdS) | 2.42 |
| titanium dioxide ($TiO_2$) | 3.0 |
| strontium titanate ($SrTiO_3$) | 3.2 |

[1]N. Lewis et al., "Theory of Semiconductor Material", Photocatalysis at page 55 which is hereby incorporated by reference.

The choice of semiconductor photocatalyst used in the sizing composition will depend on the organic components of the sizing composition to be degraded and the reduction/oxidation power of the photocatalyst. As used herein, the term "reduction power" means a measure of the reduction strength of the electrons and is taken as the energy level of the bottom of the conduction band of the photocatalyst, and the term "oxidation power" means a measure of the oxidation strength of the holes and is taken as the energy level of the upper edge of the valence band of the photocatalyst (*T. Sakata* at page 314). Many organic compounds can be completely oxidized to carbon dioxide when titanium dioxide is used as the photocatalyst due to the strong oxidation powder of titanium dioxide (*T. Sakata* at page 318). For more information, see *T. Sakata* at pages 314–338, which are hereby incorporated by reference. Therefore, in one, non-limiting embodiment of the present invention, the preferred photocatalyst material is titanium dioxide, and preferably anatase phase titanium dioxide. Although not required in the present invention, if desired, the titanium dioxide photocatalyst can be coated with an electron accepting material (or co-catalyst) such as platinum to improve the efficiency of the photocatalyst.

In another, non-limiting embodiment of the present invention, the photocatalyst material is zinc oxide. Both zinc oxide and titanium dioxide, in addition to being photocatalysts, can impart whiteness to composites made from fibers having zinc oxide or titanium dioxide on their surfaces, which can Is be advantageous in some applications.

In still another, non-limiting embodiment of the present invention, the photocatalyst material is a metal dichalcogenide, such as molybdenum disulfide. Molybdenum disulfide, in addition to being a photocatalyst, is also a solid lubricant and can act to reduce wear and friction during fiber processing steps (such as weaving) and can impart desirable lubricating characteristics to composite materials made from fibers having molybdenum disulfide on their surfaces.

The amount of photocatalyst material added to the sizing composition can be any amount that produces the desired organic removal. In one, non-limiting embodiment of the present invention, the photocatalyst material comprises from about 0.1 to about 99 percent by weight of the sizing composition on a total solids basis, preferably from about 20 to about 90 percent by weight of the sizing composition on a total solids basis and more preferably from about 50 to about 90 percent by weight of the sizing composition on a total solids basis. It is believed that if the photocatalyst material comprises more than about 99 percent by weight of the sizing composition on a total solids basis the sizing composition will be difficult to apply to the fibers during forming. It is further believed that if the photocatalyst material comprises less than about 0.1 percent by weight of the sizing composition on a total solids basis that the organic removal will be incomplete or inefficient.

Photocatalytically degradable organic materials suitable for use in the present invention, include but are not limited to, polymeric film-forming materials (such as starches, thermoplastic materials, and thermosetting materials), lubricants (such as oils and waxes), softening agents (such as amine salts of fatty acids), emulsifying agents (such as ethylene oxide derivatives of sorbitol esters), surfactants, and coupling agents (such as organosilanes). In a non-limiting preferred embodiment of a sizing composition according to the present invention, the photocatalytically degradable organic material is a film-forming material. More preferably, the film-forming material is a starch material.

The sizing composition according to the present invention can be prepared by any method well known to one skilled in the art, such as by dispersing the one or more photocatalyst materials in an aqueous solution comprising the one or more photocatalytically degradable organic materials.

The sizing composition can then be applied to the fibers 12 by any method known in the art, such as by passing the fibers over stationary or rotating belt of an applicator or by spraying. Suitable applicators are discussed in *Loewenstein* at pages 165–171, which are hereby incorporated by reference.

After applying the sizing composition comprising one or more photocatalytically degradable organic materials 15 and one or more photocatalyst materials 14 to at least a portion of the surfaces 16 of the fibers 12, the fibers 12 are gathered together to form a strand 10, which is subsequently wound onto a forming tube to form a forming package. The strands 10 can then be dried, if desired, or they can be chopped or twisted to form a yarn. See *Loewenstein* at pages 325–330, which are hereby incorporated by reference.

Yarns made in accordance with the present invention can further be formed into a fabric. Preferably, the yarns are woven on an air-jet loom. As used herein the term "air-jet loom" means a type of loom in which the fill yarn (weft) is inserted into and directed through the warp shed by a blast of compressed air from one or more air jet nozzles.

Figure 3:
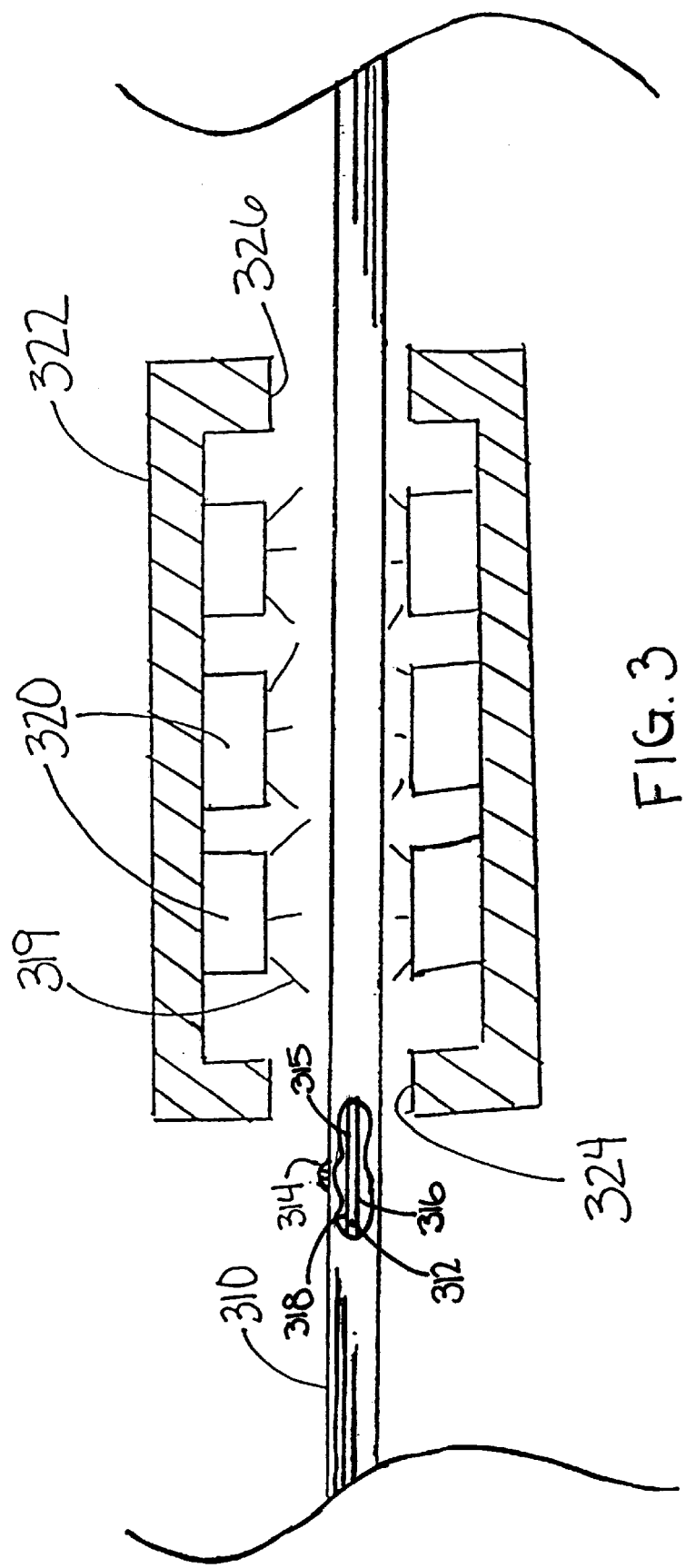
FIG. 3 is a schematic, cross-sectional view of an apparatus for removing the primary layer of dried residue of a sizing composition incorporating features of the present invention, with portions removed for clarity.

An apparatus for at least partially removing sizing compositions in accordance with the present invention will now be discussed generally. Referring to FIG. 3, a fiber strand 310, having a layer 318 of an at least partially dried residue of a primary sizing composition comprising one or more photocatalytically degradable organic materials 315 and one or more photocatalyst materials 314 on a surface 316 thereof, is formed as described in detail above. The strand 310 is then exposed to radiation 319 from one or more radiation sources 320 to activate the photocatalyst material 314 and at least partially degrade the one or more photocatalytically degradable organic materials 315 of the sizing layer 318. Although not required, preferably, the radiation source(s) 320 are enclosed in a housing 322 and the fiber strand 310 or a fabric incorporating the fiber strand 310 is passed through openings 324, 326 in the housing 322 and exposed to the radiation 319 from the 25 radiation source(s) 320 to at least partially remove at least a portion of the photocatalytically degradable organic material 315 in the layer 318 of the sizing in a continuous process.

The strand 310 is preferably positioned less than about 2 inches (about 5.08 centimeters), more preferably less than about 1 (about 2.54 centimeters) inch and most preferably less than about 0.5 inches (about 1.27 centimeters) from the radiation sources 320.

Referring again to FIG. 3, in one non-limiting embodiment of the invention, at least one of the one or more radiation sources 320 is an ultraviolet light source. The ultraviolet light source can have any wavelength necessary to promote the photocatalytic reactions as discussed above. In one, non-limiting embodiment of the present invention, the ultraviolet light source is a black light source (i.e. has a wavelength of about 300 nanometers to about 400 nanometers). In a specific, non-limiting embodiment of the present invention where the photocatalyst material is titanium dioxide, the preferred radiation source has a wavelength ranging from about 300 nanometers to about 350 nanometers.

Radiation sources having a shorter wavelength, such as 289 nanometer and 254 nanometer sources, can also be used in accordance with the present invention. Unfiltered radiation sources of such wavelengths can produce ozone molecules during operation that can assist in the degradation of organic sizing components. However, the production of ozone is generally undesirable and is preferably avoided by using filtered sources, such as are well known in the art. If shorter wavelength radiation sources are used, most preferably, they are enclosed in a housing.

It will be recognized by one skilled in the art that the efficiency of the photocatalytic degradation process for a given photocatalyst is dependent, in part, on the intensity of the radiation source having a wavelength sufficient to activate the photocatalyst material employed. Therefore, the radiation source intensity can be selected to give the required removal rates. In one non-limiting embodiment, the intensity of at least one, and preferably all, of the radiation sources is greater than about 2 milliWatts per square centimeter, and more preferably greater than about 4 milliWatts per square centimeter.

In another non-limiting embodiment of the invention, in addition to the ultraviolet light source, there is preferably at least one infrared radiation source included in the one or more radiation sources 320 to increase the ambient temperature proximate the fiber surface to accelerate the desorption of the products of decomposition of the organic sizing components from the surface of the photocatalyst and the fibers. Although not limiting in the present invention, preferably the ambient temperature proximate the surface of the strand ranges from about 50° C. to about 120° C. (about 122° F. to about 248° F.) and more preferably ranges from about 70 C. to about 1 00 C. (about 158 F. to about 212° F.).

Although not limiting in the present invention, to enhance the degradation of the one or more photocatalytically degradable organic materials, the relative humidity proximate the surface of the strands 310 is preferably at least about 5 percent, more preferably at least about 7 percent and most preferably at least about 10 percent. Although not meant to be limiting in the present invention, the desired humidity level can be achieved by, for example, wetting the strand prior to exposure to the radiation sources or by positioning a humidity source (such as a water vaporizer) proximate the radiation source(s) during the exposure process.

It will be recognized by one skilled in the art that the coated strands 310 of the present invention can chopped, twisted, knitted, woven or otherwise processed prior to exposure to the radiation sources in accordance with the present invention. In one non-limiting embodiment of the present invention, the strands are twisted to form a yarn and the yarns are woven on a loom to form a fabric immediately prior to exposure to the radiation sources.

It will be further recognized by one skilled in the art that apparatus of the present invention can be adapted to fit directly in-line with other processing equipment, such as weaving looms and mat forming lines.

Referring again to FIG. 3, if desired, after exposure to the one or more radiation sources 320 and removal of at least a portion of the photocatalytically degradable organic material 315from the surfaces 316 of fibers 312 of fiber strand 310, the strand 310 can be re-coated with a finishing size material to improve bonding between polymeric matrix materials and the surface of the glass. The fiber strand 310 can then be incorporated into polymeric matrix materials to form fiber glass reinforced composites.

Figure 2:
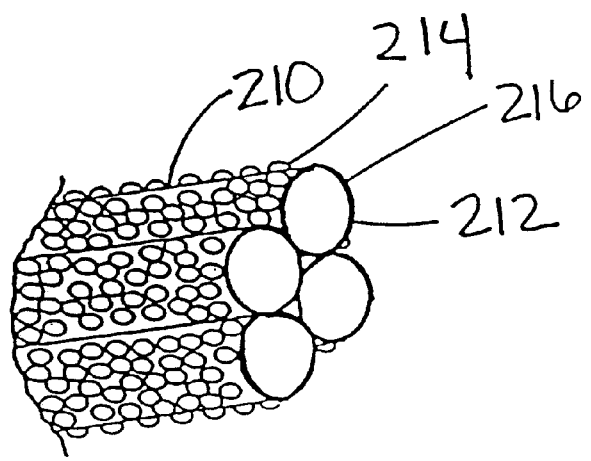
FIG. 2 is a perspective view of a fiber strand after removal of at least a portion of the primary layer of dried residue.

Referring now to FIGS. 2 and 3, after exposure to the one or more radiation sources 320, at least some of the photocatalyst material 214 (shown in FIG. 2) remains on at least a portion of the surface 216 of the fibers 212 of the strand 210. The photocatalyst material 214 can be removed, if desired, by using compressed air or washing with water after exposure to the radiation sources 320, but is preferably left on the surface of the fiber strand 210. As previously discussed, the photocatalyst material 214 can impart additional, desirable properties (such as whiteness or lubricity) to composite materials formed using fiber strands having the photocatalyst material on their surfaces.

A method of at least partially removing a sizing composition comprising one or more photocatalytically degradable organic materials and one or more photocatalyst materials from at least a portion of the surface of a glass fiber according to the present invention will now be discussed generally. Glass fibers 12 are attenuated from a fiber forming apparatus. An at least partial coating 18 of a sizing composition comprising one or more photocatalytically degradable organic materials 15 and one or more photocatalyst materials 14 is applied to the surfaces 16 of the fibers 12 immediately after forming. The fibers 12 are gathered together to form a strand 10. The strands 10 are subsequently exposed to one or more radiation sources as described above to remove at least a portion of the photocatalytically degradable organic materials of the sizing composition from the fiber surfaces of the strands 10.

Preferably, the strands 10 are twisted to form yarns and the yarns are woven into a fabric before exposure to the at least one radiation source. In a preferred embodiment of the present invention, immediately after weaving, the fabric is exposed at least one radiation source, as described above, to remove at least a portion of the photocatalytically degradable organic materials of the sizing composition from the surfaces of the fibers. In one non-limiting embodiment of the invention, the fabric is exposed to the one or radiation sources while it is still on the loom.

The present invention will now be illustrated by the following specific, non-limiting examples.

EXAMPLE 1

Two sizing compositions were made according to Table 1. As can be seen, Sizing Composition A contained a photocatalyst material according to the present invention whereas the Comparative Example did not.

TABLE I

| Component | Weight Percent on a Total Solids Basis | |
|---|---|---|
| | Composition A | Composition B |
| A-1100[2] | 11.7 | 54.88 |
| CATION X[3] | 0.66 | 3.09 |
| IGEPAL CA-630[4] | 8.99 | 42.03 |
| Degussa P25 Titanium Dioxide Powder[5] | 78.61 | 0 |

[2]A1100 gamma-aminopropyltriethoxysilane coupling agent, which is commercially available from OSi Specialties, Inc. of Tarrytown, New York.
[3]CATION X alkyl imidazoline derivative, which is commercially available from Rhone Poulenc of Princeton, New Jersey.
[4]IGEPAL CA-630 ethoxylated octylphenoxyethanol which is commercially available from GAF Corporation of Wayne, New Jersey.
[5]Degussa P25 Titanium Dioxide Powder, which is commercially available from Degussa Corp. of Germany.

Fiber glass strands were coated during forming with each of the sizing compositions shown in Table I to form Sample A and a Comparative Sample. The strands were dried at about 245 F. (about 118° C.) for about 12 to about 16 hours.

Three samples were obtained from each material (Sample A and Comparative Sample) for testing by winding the fiber glass strand onto individual cardboard backings. One of the three samples from each material 10 was exposed on one side to 313 nanometer wavelength ultraviolet radiation for about 1 hour, a second sample from each material was exposed on one side to 313 nanometer wavelength ultraviolet radiation for about 120 hours (5 days) and the third sample from each material was not exposed to ultraviolet radiation. The exposure equipment was a QUV Weatherometer commercially available from Q-Panel of Cleveland, Ohio. The temperature in the chamber was maintained at about 30° C. to 40° C. The intensity of the radiation sources ranged from about 3.6 to about 5.0 milliWatts per square centimeter.

Figure 4:
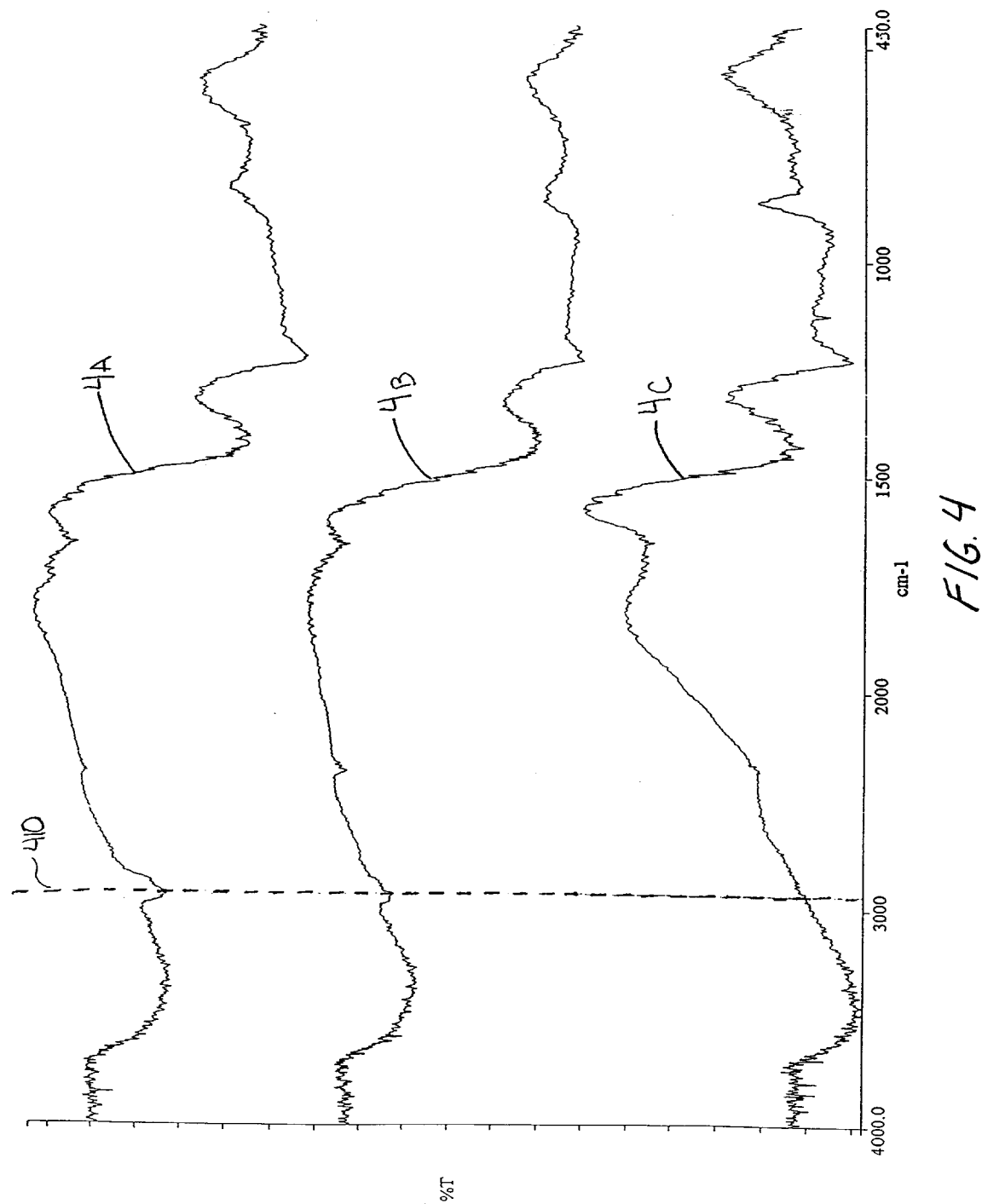
FIG. 4 is a composite plot of spectra taken using diffuse reflectance infrared spectroscopy of a sizing composition incorporating features of the present invention before and after exposure to ultraviolet radiation.

Diffuse reflectance infrared spectroscopy was then conducted on each of the samples. The spectra for the samples have been separated for clarity. The spectrum for the unexposed Sample A (shown in FIG. 4, curve 4A) shows a distinct band at a wavenumber of about 2900 (centimeters)$^{-1}$ (indicated by reference line 410in FIG. 4), indicative of —$CH_2$ or —$CH_3$ bonding. The spectrum for Sample A exposed to ultraviolet radiation for about 1 hour (shown in FIG. 4, curve 4B) shows a slightly smaller band at a wavenumber of about 2900 (centimeters)$^{-1}$ (indicated by reference line 410in FIG. 4). The spectrum for Sample A exposed to ultraviolet radiation for about 120 hours (shown in FIG. 4, curve 4C) does not have a band at a wavenumber of about 2900 (centimeters)$^{-1}$ (indicated by reference line 410in FIG. 4). This indicates that at least some of the organic components of the sizing composition have been removed from the surface of the fibers after about 1 hour of radiation exposure and additional organic components were removed after about 120 hours exposure.

Figure 5:
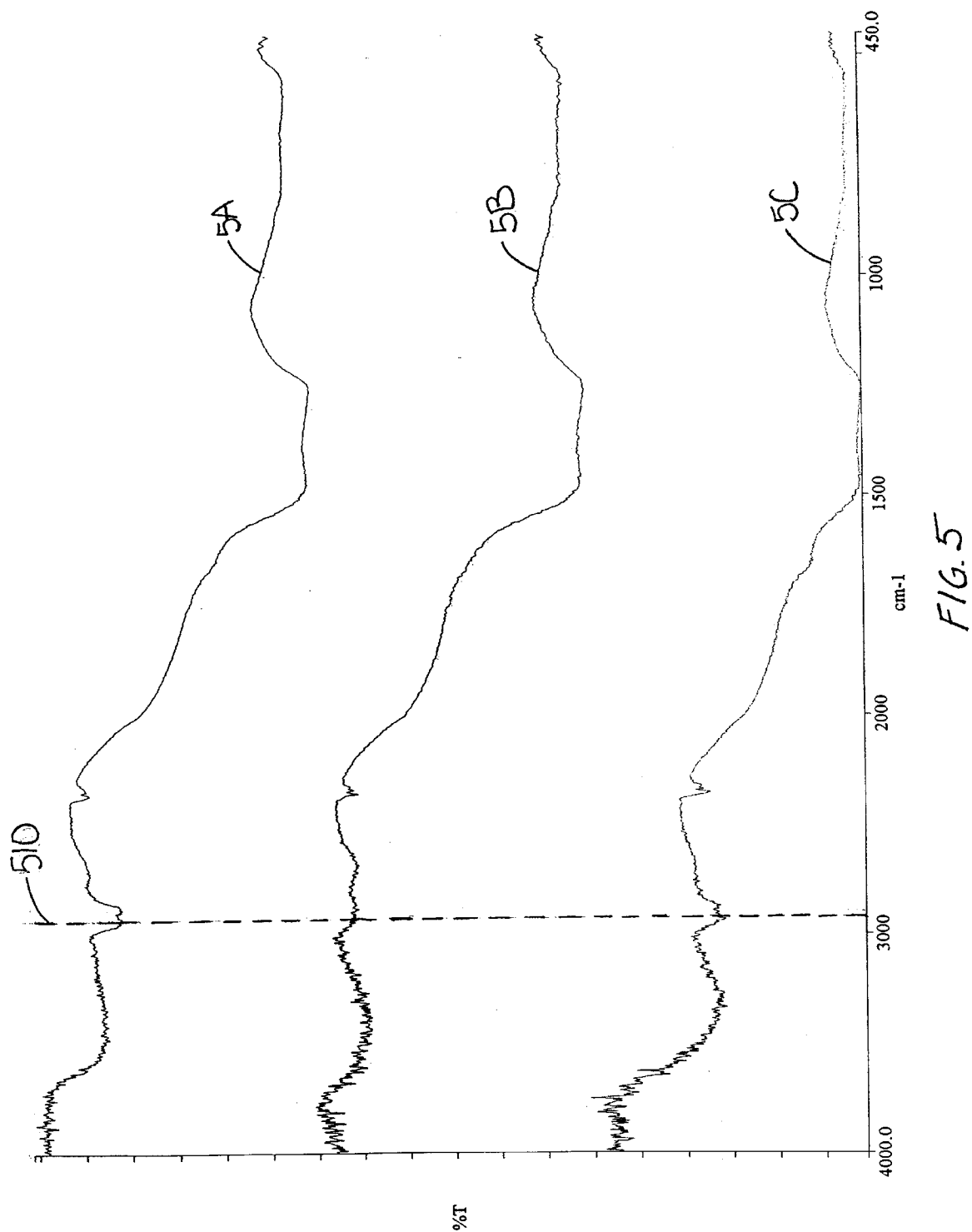
FIG. 5 is a composite plot of spectra taken using diffuse reflectance infrared spectroscopy of a sizing composition incorporating conventional constituents before and after exposure to ultraviolet radiation.

In comparison, as shown in FIG. 5, all of the spectra (curve 5A, unexposed; curve 5B, 1 hour exposure; and curve 5C, 120 hour exposure) for the Comparative Sample have a similar band at a wavenumber of about 2900 (centimeters)$^{-1}$ (indicated by reference line 510 in FIG. 5).

EXAMPLE 2

A sizing composition was made according to Table II. Fiber glass strands were coated during forming with the sizing composition shown in Table II to form Sample B.

| Component | Weight Percent on a Total Solids Basis Composition B |
|---|---|
| ECLIPSE OIL 102[6] | 20.6 |
| CATION X[7] | 4.5 |
| Macol E 300[8] | 17.4 |
| T MAZ 81 Esters[9] | 4.8 |
| Kessco DGMS[10] | 1.8 |
| Degussa P25 Titanium Dioxide Powder[11] | 50.9 |

[6]ECLIPSE OIL 102 partially hydrogenated soy bean oil, which is commercially available form Loders Croklan of Glen Ellyn, IL.
[7]CATION X alkyl imidazoline derivative, which is commercially available from Rhone Poulenc of Princeton, New Jersey.
[8]MACOL E 300 polyethylene glycol, which is commercially available from BASF of Parsippany, New Jersey.
[9]T MAZ 81 ESTERS ethylene oxide derivative of a sorbitol ester, which is commercially available from BASF of Parsippany, New Jersey.
[10]Kessco DGMS diethylene glycol monostearate, which is commercially available from Stepan Company of Chicago, Illinois.
[11]Degussa P25 Titanium Dioxide Powder, which is commercially available from Degussa Corp. of Germany.

Two specimen were obtained from Sample B by winding the fiber glass strand onto individual cardboard backings. One of the two specimen was exposed on one side to 313 nanometer wavelength ultraviolet radiation for about 120 hours and the second specimen was not exposed to ultraviolet radiation. The exposure equipment was a QUV Weatherometer commercially available from Q-Panel of Cleveland, Ohio. The temperature in the chamber was maintained at about 30° C. to 40° C. The intensity of the radiation sources ranged from about 3.6 to about 5.0 milliWatts per square centimeter.

Diffuse reflectance infrared spectroscopy was then conducted on each of the samples. No significant changes were observed in the spectrum of the specimen exposed for 120 hours to UV radiation (FIG. 6, curve 6B) as compared to the spectrum of the unexposed specimen (FIG. 6, curve 6A).

Several factors including the amount of photocatalyst used, the intensity and wavelength of radiation sources and the exposure temperature are believed to have contributed to the lack of measurable organic removal after the UV exposure in this example.

It will be appreciated by those skilled in the art that changes could be made to the embodiments described above without departing from the broad inventive concept thereof. It is understood, therefore, that this invention is not limited to the particular embodiments disclosed, but is intended to cover modifications which are within the spirit and scope of the invention, as defined by the appended claims.

We claim:

1. A sizing composition for use in a fiber forming operation, the sizing composition comprising:
    A. a photocatalytically degradable organic material comprising at least one film-forming material; and
    B. a photocatalyst material, wherein the photocatalyst material is capable of degrading at least a portion of the photocatalytically degradable organic material upon exposure to at least one radiation source having a wavelength sufficient to activate the photocatalyst material and wherein the at least one film-forming material comprises starch.

2. The sizing composition according to claim 1, wherein the photocatalyst material comprises at least one of zinc oxide, titanium dioxide, and molybdenum disulfide.

3. The sizing composition according to claim 2, wherein the photocatalyst comprises titanium dioxide.

4. The sizing composition according to claim 1, wherein the photocatalyst material is capable of directly degrading at least a portion of photocatalytically degradable organic material.

5. The sizing composition according to claim 1, wherein the photocataiyst material is capable of indirectly degrading at least a portion of the photocatalytically degradable organic material.

6. A fiber strand comprising a plurality of individual filaments, at least one filament of the plurality of individual filaments comprising a residue of a coating composition positioned upon at least a portion of a surface of the at least one filament, the coating composition comprising:
    A. a photocatalytically degradable organic material comprising at least one film-forming material; and
    B. a photocatalyst material, wherein the photocatalyst material is capable of degrading at least a portion of the photocatalytically degradable organic material upon exposure to at least one radiation source having a wavelength sufficient to activate the photocatalyst material and wherein the at least one film-forming material comprises starch.

7. The fiber strand according to claim 6, wherein the photocatalyst material comprises at least one of zinc oxide, titanium dioxide, and molybdenum disulfide.

8. The fiber strand according to claim 7, wherein the photocatalyst material comprises titanium dioxide.

9. The fiber strand according to claim 6, wherein the photocatalyst material is capable of directly degrading at least a portion of the photocatalytically degradable organic material.

10. The fiber strand according to claim 6, wherein the photocatalyst material is capable of indirectly degrading at least a portion of the photocatalytically degradable organic material.

11. A fabric comprising one or more fiber strands comprising a residue of a coating composition positioned upon at least a portion of a surface of at least one of the one or more fiber strands, the coating composition comprising:
    A. a photocatalytically degradable film-forming organic material comprising at least one film-forming material; and
    B. a photocatalyst material, wherein the photocatalyst material is capable of degrading at least a portion of the photocatalytically degradable film-forming organic material upon exposure to at least one radiation source having a wavelength sufficient to activate the photocatalyst material, wherein the at least one film-forming material comprises starch.

12. The fabric according to claim 11, wherein the photocatalyst material comprises at least one of zinc oxide, titanium dioxide, and molybdenum disulfide.

13. The fabric according to claim 12, wherein the photocatalyst material comprises titanium dioxide.

14. The fabric according to claim 11, wherein the photocat a lyst material is capable of directly degrading at least a portion of the photocatalytically degradable organic material.

15. The fabric according to claim 11, wherein the photocatalyst material is capable of indirectly degrading at least a portion of the photocatalytically degradable organic material.

16. A method of forming a fiber strand, the method comprising the steps of:
    A. attenuating a plurality of individual filaments from a fiber forming apparatus;
    B. applying a coating composition to at least a portion of the surface of one or more of the plurality of individual filaments, the coating composition comprising a photocatalytically degradable organic material, which comprises a starch, and a photocatalyst material;
    C. gathering the plurality of individual filaments together to form a coated fiber strand; and
    D. exposing the coated fiber strand to at least one radiation source having an wavelength sufficient to activate the photocatalyst to photocatalytically degrade at least a portion of the photocatalytically degradable organic material.

17. The method according to claim 16, wherein the photocatalyst material is selected from the group consisting of zinc oxide, titanium dioxide, and molybdenum disulfide.

18. The method according to claim 17, wherein the photocatalyst is titanium dioxide.

19. The method according to claim 16, wherein the exposing step further comprises exposing the coated fiber strand to an ultraviolet radiation source.

20. The method according to claim 19, wherein the ultraviolet radiation source has a wavelength ranging from bout 280 nanometers to about 400 nanometers.

21. The method according to claim 19, wherein the radiation source further comprises an infrared radiation source.

22. The method according to claim 16, further comprising weaving the coated fiber strand into a fabric prior to exposing.

23. The method according to claim 22, further comprising removing at least a portion of the photocatalyst material from at least a portion of the surface of the strand after exposing.

24. The method according to claim 22, further comprising applying a finishing size to at least a portion of the fiber strand after exposing.

25. The method according to claim 16, further comprising forming a mat from the coated fiber strand prior to exposing.

26. A sizing composition for use in a fiber forming operation, the sizing composition comprising:

A. a photocatalytically degradable organic material comprising at least one film-forming material; and B. a photocatalyst material, wherein the photocatalyst material is capable of degrading at least a portion of the photocatalytically degradable organic material upon exposure to at least one radiation source having a wavelength sufficient to activate the photocatalyst material and wherein the photocatalyst material comprises from about 20 to about 90 percent by weight of the sizing composition on a total solids basis.

27. The sizing composition of claim 26, wherein at least one radiation source comprises at least one ultraviolet light source.

28. A fiber strand comprising a plurality of individual filaments, at least one filament of the plurality of individual filaments comprising a residue of a coating composition positioned upon at least a portion of a surface of the at least one filament, the coating composition comprising:

A. a photocatalytically degradable organic material comprising at least one film-forming material; and B. a photocatalyst material, wherein the photocatalyst material is capable of degrading at least a portion of the photocatalytically degradable organic material upon exposure to at least one radiation source having a wavelength sufficient to activate the photocatalyst material and wherein the photocatalyst material comprises from about 20 to about 90 percent by weight of the coating composition on a total solids basis.

29. The fiber strand of claim 28, wherein the at least one radiation source comprises at least one ultraviolet light source.

30. A method of forming a fiber strand, the method comprising the steps of:

A. attenuating a plurality of individual filaments from a fiber forming apparatus;

B. applying a coating composition to at least a portion of the surface of one or more of the plurality of individual filaments, the coating composition comprising a photocatalytically degradable organic material and a photocatalyst material, wherein photocatalyst material comprises from about 20 to about 90 percent by weight of the coating composition on a total solids basis;

C. gathering the plurality of individual filaments together to form a coated fiber strand; and D. exposing the coated fiber strand to at least one radiation source having a wavelength sufficient to activate the photocatalyst to photocatalytically degrade at least a portion of the photocatalytically degradable organic material.

31. A method of forming a fiber strand, the method comprising the steps

A. attenuating a plurality of individual filaments from a fiber forming apparatus;

B. applying a coating composition to at least a portion of the surface of one or more of the plurality of individual filaments, the coating composition comprising a photocatalytically degradable organic material and a photocatalyst material;

C. gathering the plurality of individual filaments together to form a coated fiber strand; and D. exposing the coated fiber strand to at least one ultraviolet light source having a wavelength sufficient to activate the photocatalyst to photocatalytically degrade at least a portion of the photocatalytically degradable organic material.

* * * * *